J. CULTON.
BEET HARVESTER.
APPLICATION FILED JULY 17, 1917.
1,303,858.
Patented May 20, 1919.
2 SHEETS—SHEET 1.
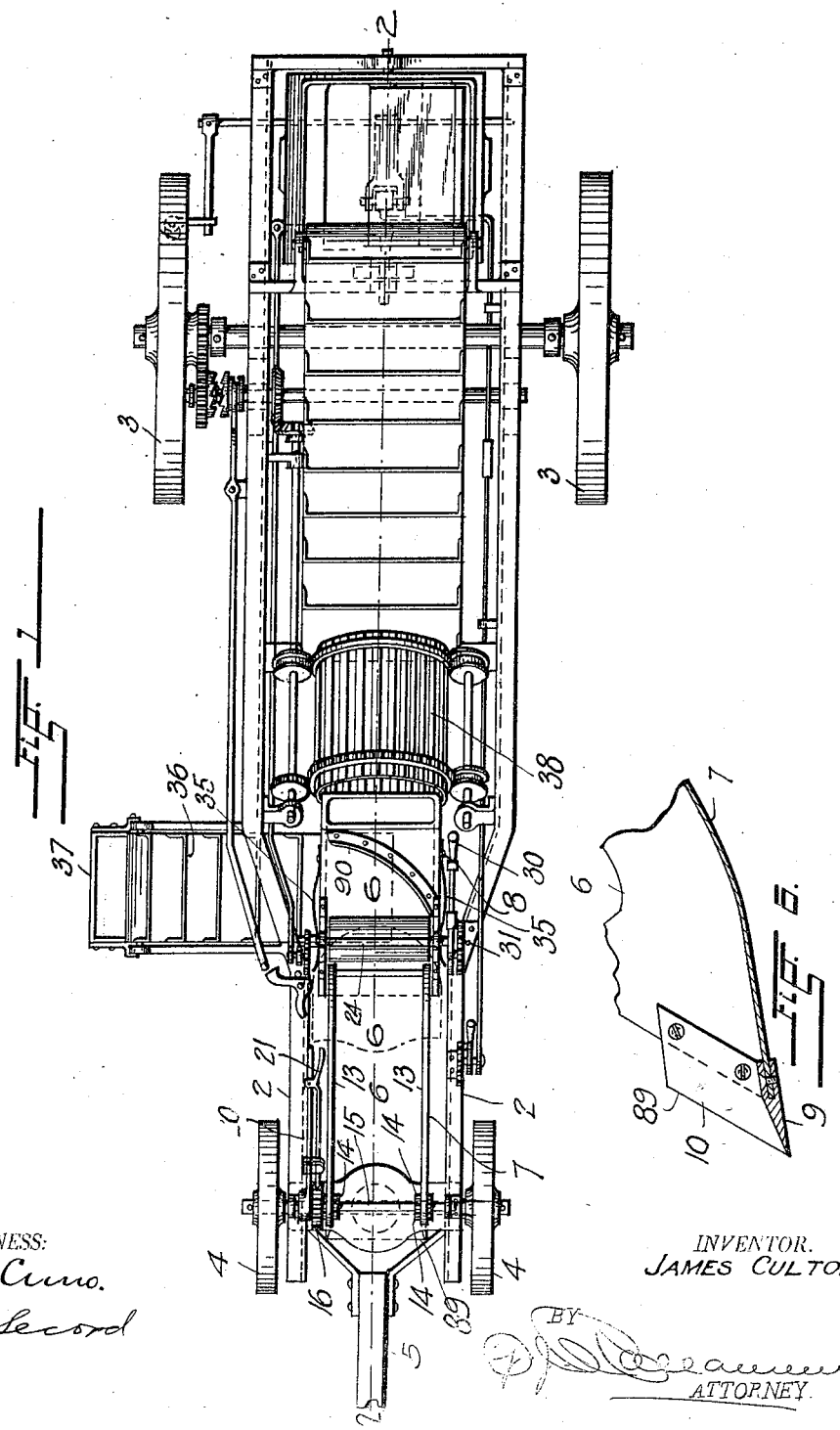
WITNESS:
J.H. Cuno.
D.A. Secord
INVENTOR.
JAMES CULTON.
BY
ATTORNEY.

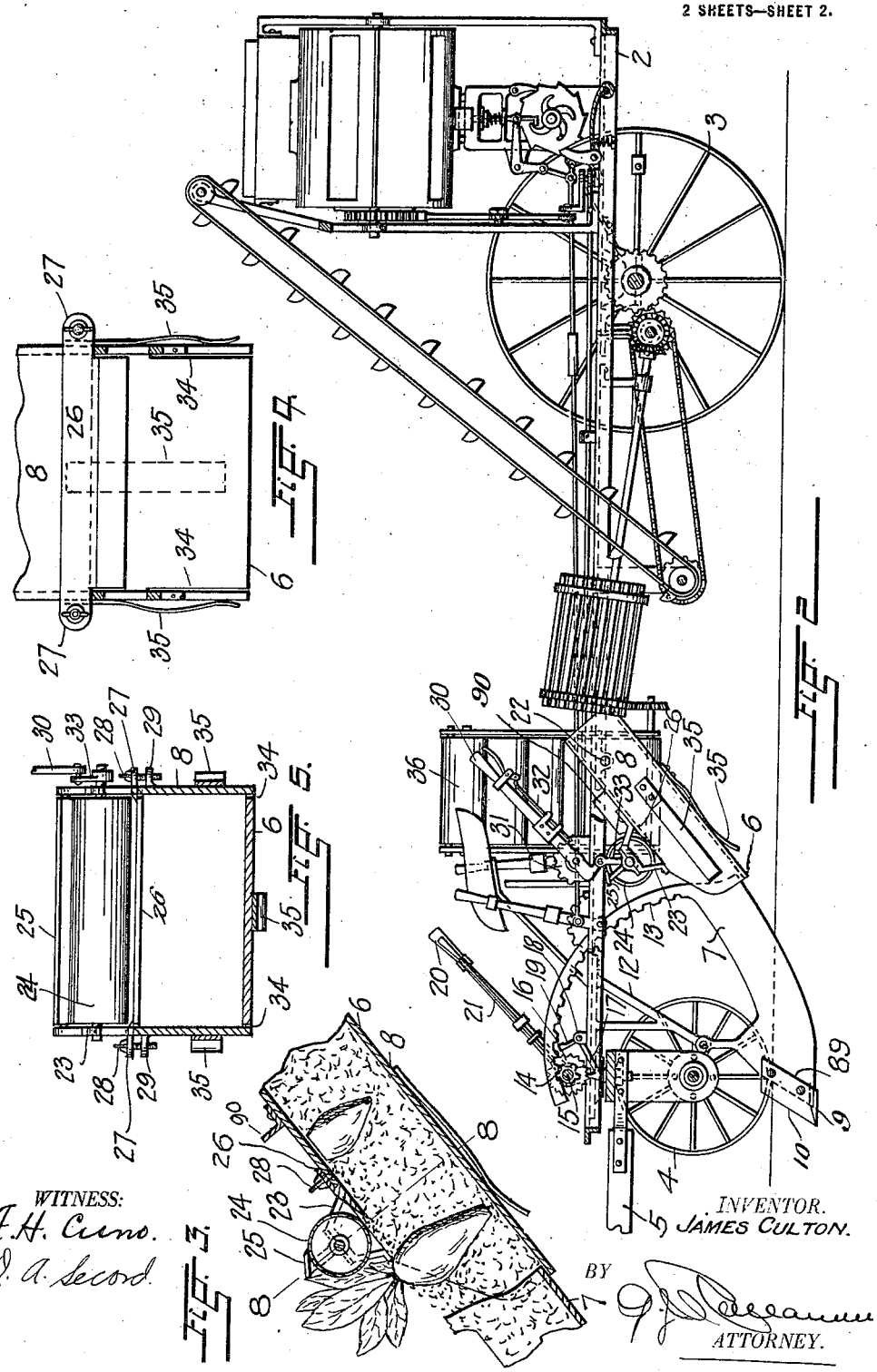

UNITED STATES PATENT OFFICE.

JAMES CULTON, OF DENVER, COLORADO.

BEET-HARVESTER.

1,303,858.      Specification of Letters Patent.      Patented May 20, 1919.

Application filed July 17, 1917. Serial No. 181,075.

*To all whom it may concern:*

Be it known that I, JAMES CULTON, a citizen of the United States, residing at Denver, in the county of Denver and State of Colorado, have invented certain new and useful Improvements in Beet-Harvesters, of which the following is a specification.

My invention relates to beet harvesters and its primary object is to provide in a machine of simple and practical construction, an association of coöperative devices which lift the beets together with the soil in which they are grown, sever the tops of the beet-roots and after the latter have been separated from the soil and cleaned of adherent matter, deliver the tops and the roots separately, all while the machine is compelled along the rows of beet-plants in the field to be harvested.

I attain this object by cutting and lifting by the movement of the machine along a row of beet plants, the soil in which the beets are grown, in a continuous strip.

The beets thus remaining in their original position are brought into contact with an adjusting device which brings their crowns in a common plane and they are subsequently moved into contact with a cutting implement which severs their tops.

The above and other objects, all of which will fully appear in the course of the following description, I attain by the constructions and combinations of devices which in their preferred form, have been shown in the accompanying drawings.

In the drawings in the various views of which corresponding parts have been denoted by like characters of reference, Figure 1 represents a plan view of my improved harvesting machine, Fig. 2, a longitudinal section of the same taken along the line 2—2, Fig. 1, Fig. 3, an enlarged section taken along the line 6—6, Fig. 1, showing the position of the beets relative to the adjusting and topping devices of the mechanism, Fig. 4, a plan view of the trough-shaped part of the machine which carries the topping implement, Fig. 5, a section taken along the line 8—8, Fig. 3, and Fig. 6, an enlarged longitudinal section of the plow of the machine by which the section of the soil in which the beets are grown, is cut and lifted.

Referring more specifically to the drawings, the reference character 2 designates the frame of a carriage which is supported at its rear end upon the road on traction-wheels 3 and at its front end upon a pivoted truck 4 to which the tongue 5 is attached.

Mounted at the forward end of the frame is an open-ended rearwardly inclined trough 6 which is composed of two separately adjustable sections 7 and 8.

The forward section 7 of the trough carries at its forward end a plow 89 which cuts the ground at opposite sides and beneath the rows of beets, to produce a beet-carrying strip of soil which by the movement of the machine advances upwardly in the trough.

The plow consists of a knife-blade 9 extending forwardly of the horizontal lower edge of the bottom of the trough, and two knives 10 which extend at right angles to the other at the forward edges of the substantially parallel sides of the same.

For convenience in manufacture and adjustment, the three knives are preferably made of one continuous piece of steel bent in U-shape and sharpened at its forward edge.

The lower trough-section 7 is pivotally suspended from the end of brackets 12 which depend from the forward end of the frame, and it carries at its rear end a pair of forwardly curved segmental racks 13 which mesh with corresponding pinions 14 on a shaft 15.

The shaft is rotatably supported in bearings on the frame of the machine and carries a toothed wheel 16 which in coöperation with a detent 17, holds the same against retrograde movement.

The detent is pivoted on the frame as at 18, and is formed integrally with a pedal 19 by means of which it may be disengaged from the toothed wheel to release the shaft for rotation.

An operating lever 20 is mounted to rotate about the axis of the shaft and to impart an intermittent rotary movement thereto in one direction, by the engagement of a hand-released, spring-pressed pawl 21 which engages the teeth of the wheel.

By imparting a rocking motion to the lever the section of the trough to which the plow is attached, may be moved about its pivot in a rearward direction to lift its forward end to an inoperative position above the surface of the ground or to force it into the soil at the beginning of the operation.

The upper and rearward section 8 of the trough is pivotally suspended from the frame as at 22, and is adjustable to preserve its continuity with relation to the forward section.

The section 8 carries in boxes 23, a roller 4 which in the operation of the machine adjusts the position of the beets in the soil passing through the trough to bring their crowns in a common plane.

A scraper 25 supported upon the boxes 23 is placed longitudinally above the roller to clean its peripheral surface of adherent dirt.

The topping implement of the mechanism comprises a flat knife 26 which is adjustably supported upon the trough section rearward of the roller with its cutting edge a short distance below the same as best shown in Fig. 3.

The knife is provided with ears 27 which project across the sides of the trough-section and carry swiveled, headed screws 28 for its adjustable connection with lugs 29 fixed exteriorly of said sides.

The adjustment of the upper section of the trough to preserve its continuity with the lower section of the same, is effected by a lever 30 which is fulcrumed on a toothed segment 31 on the frame and is provided with the usual hand-adjusted pawl 32 to lock it in its adjusted positions.

A link 33 mounted on the shaft of the roller connects the trough section with an arm at the lower end of the lever 30.

The forward portions of the parallel sides of the rear section of the trough are severed from the bottom of the same by slits 34 to permit of the resilient deflection of the sides and the bottom by expansion of the soil in the trough, produced by the downward pressure exerted on the beet-roots by the adjusting roller 24.

Springs 35 secured at their ends in the sides and the bottom of the rearward trough section in engagement with the deflective portions thereof, yieldingly hold said portions in their normal position.

The beet-tops severed from the roots by the action of the knife 26 are crowded across the upper surface of the knife and a therewith continuous platform on the trough, against a curved flange 90 which guides them toward the lower end of an endless bucket conveyer 36 which projects laterally from the frame. The conveyer elevates the tops to a point of discharge above a receptacle 37 from which they are removed at intervals.

The roots of the beets which with the strip of soil in which they are embedded, move underneath the knife, are discharged through the open upper end of the trough into a slightly inclined, peripherally slotted trommel 38 in which they are separated from the soil and cleaned of adherent dirt.

To operate the machine the lower section of the trough 6 at the forward end thereof which normally is raised above the surface of the ground, is by means of the lever 20 moved about its pivot to compel the plow 89 at its forward end to enter the soil and assume the position shown in Fig. 2 of the drawings.

The rearward section of the trough has previously been adjusted to a position in which it is contiguous with the lower section.

The machine with the parts of its mechanism thus coöperatively positioned, is drawn along a row of beet-plants which is straddled by its wheels to extend between the two upwardly extending knives of the plow.

As a result of the forward movement of the machine the plow cuts out of the ground the strip of soil in which the beets are grown, and this strip being raised in the trough carries the beets in the position they originally occupied, into contact with the roller 24.

The roller engaging the upper portions of the beets, moves their tops into a common plane to insure of their being severed by the subsequent action of the topping knife at predetermined uniform distances from their crowns.

The resilient spring-pressed portions of the trough-section yield by lateral expansion of the soil due to the downward movement of the beet-roots and thereby prevent the beet roots from being crushed as otherwise might occur.

Further advancement of the strip of soil in the trough brings the beets it carries into contact with the cutting edge of the knife which severs the tops from the beet roots.

The severed tops are crowded across the upper surface of the knife toward the conveyer which carries them to a point of discharge above the receptacle 37 from which they are subsequently discharged.

The roots of the beets, which remain in the soil pass underneath the topping knife through the upper end of the trough into the trommel which is continuously rotated by its connection with the line-shaft.

The rotary movement of the trommel separates the roots from the dirt which is discharged through its peripheral slots into the trench produced by the action of the plow.

In this connection it is observed that the machine not only removes the beets from the soil, but thoroughly cultivates and pulverizes the ground and thereby puts it in a condition well adapted for future seeding or planting.

Having thus described the construction of my improved harvesting machine in the best form at present known to me I desire it understood that variations in the form and arrangement of its coöperative devices may be resorted to within the spirit of my invention, and that while the machine is more particularly designed for harvesting beets used in the manufacture of sugar, it may be employed with equally satisfactory results in harvesting other root vegetables, such as turnips, carrots, potatoes, etc.

It is furthermore observed that the character of the operating means of my improved harvesting machine, permits of its being mounted upon an ordinary wagon gear with but small expenditure of time, money, and labor.

What I claim and desire to secure by Letters-Patent is:

1. In a beet-harvester, the combination with a wheel-supported carriage, of a plow adapted to cut out of the ground over which the carriage is advanced, a strip of soil in which the beets are grown, a cutter for topping the beets in said strip, a way along which said strip is moved by the advancement of the carriage, to guide the beets therein, into engagement with the cutter, and an adjusting device engaging the beets during said movement of the strip of soil, to bring their crowns in a common plane before they engage the cutter.

2. In a beet-harvester, the combination with a wheel-supported carriage, of a plow adapted to cut out of the ground over which the carriage is advanced, a strip of soil in which the beets are grown, a cutter for topping the beets in said strip, a way along which said strip is moved by the advancement of the carriage, to guide the beets therein, into engagement with the cutter, and a roller engaging the beets during said movement of the strip of soil to bring their crowns in a common plane before they engage the cutter.

3. In a beet-harvester, the combination with a wheel-supported carriage, of a plow adapted to cut out of the ground over which the carriage is advanced, a strip of soil in which the beets are grown, a cutter for topping the beets in said strip, a way along which said strip is moved by the advancement of the carriage, to guide the beets therein, into engagement with the cutter, an adjusting device engaging the beets during said movement of the strip to bring their crowns in a common plane before they engage the cutter, and means for the adjustment of the cutter to vary the position of its cutting-edge with relation to the contact-portion of said device.

4. In a beet-harvester, the combination with a wheel-supported carriage, of an open-ended trough, a plow at the forward end of said trough, adapted to cut out of the ground over which the carriage is advanced, a strip of soil in which the beets are grown, a cutter for topping the beets in said strip while it is moved through the trough by the advancement of the carriage, and an adjusting device engaging the beets in the strip to bring their crowns in a common plane before they engage the cutter, the sides of the trough adjacent said device being adapted to yieldingly permit of a lateral expansion of the strip of soil by the operation thereof.

5. In a beet-harvester, the combination with a wheel-supported carriage, of an open-ended trough including an adjustable forward section, and a rearward section normally continuous therewith, a plow at the forward end of the forward section, adapted to cut out of the ground over which the carriage is advanced, a strip of soil in which the beets are grown, a cutter for topping the beets in said strip while it is moved through the trough by the advancement of the carriage, and mechanism for the adjustment of the forward section to force the plow at its forward end, into the soil from a position above the surface thereof.

6. In a beet-harvester, the combination with a wheel-supported carriage, of an open-ended trough including a pivoted forward section, and a rearward section normally continuous therewith, a plow at the forward end of the forward section, adapted to cut out of the ground over which the carriage is advanced, a strip of soil in which the beets are grown, a cutter for topping the beets in said strip while it is moved through the trough by the advancement of the carriage, and mechanism for the pivotal adjustment of the forward section to force the plow at its forward end, into the soil from a position above the surface thereof.

7. In a beet-harvester, the combination with a wheel-supported carriage, of an open-ended trough including an adjustable forward section, and a rearward section normally continuous therewith, a plow at the forward end of the forward section, adapted to cut out of the ground over which the carriage is advanced, a strip of soil in which the beets are grown, a cutter mounted on the rearward section, for topping the beets in said strip while it is moved through said section by the advancement of the carriage, and a roller on the rearward section engaging the beets to bring their crowns in a common plane before they engage the cutter.

8. In a beet-harvester, the combination with a wheel-supported carriage, of an open-ended trough including an adjustable forward section, and an adjustable rearward section normally continuous therewith, a plow at the forward end of the forward section, adapted to cut out of the ground over which the carriage is advanced, a strip of soil in which the beets are grown, a cutter mounted on the rearward section, for topping the beets in said strip while it is moved through said section by the advancement of the carriage, and a roller on the rearward section, engaging the beets to bring their crowns in a common plane before they engage the cutter.

9. In a beet-harvester, the combination with a wheel-supported carriage and a beet-topping cutter, of an appliance including means for cutting a strip of soil out of the ground over which the carriage is moved, and adapted to advance said strip by the movement of the carriage to bring the beets growing therein, into contact with the cutter.

10. In a beet-harvester, the combination with a wheel-supported carriage and a beet-topping cutter, of an appliance including means for cutting a strip of soil out of the ground over which the carriage is moved, and adapted to advance said strip by the movement of the carriage to bring the beets growing therein into contact with the cutter, and a gage forward of the cutter to bring the crowns of the beets in a common plane.

11. In a beet-harvester, the combination with a wheel-supported carriage and a beet-topping cutter, of an appliance including means for cutting a strip of soil out of the ground over which the carriage is moved, and adapted to advance said strip by the movement of the carriage to bring the beets growing therein into contact with the cutter, and a gage forward of the cutter to bring the crowns of the beets in a common plane, the portion of said appliance adjacent said gage being adapted to yieldingly permit of a lateral expansion of a strip of soil by the action thereof.

12. In a beet-harvester, the combination with a wheel-supported carriage and a beet-topping cutter, of an appliance including horizontal and vertical knives which coöperate to cut a strip of soil out of the ground over which the carriage is moved, and adapted to advance said strip by the movement of the carriage to bring the beets growing therein into contact with the cutter.

In testimony whereof I have affixed my signature in presence of two witnesses.

JAMES CULTON.

Witnesses:
G. J. ROLLANDET,
MARGUERITE RICHTER.

Copies of this patent may be obtained for five cents each, by addressing the "Commissioner of Patents, Washington, D. C."